United States Patent [19]

Renlund et al.

[11] Patent Number: 5,180,694

[45] Date of Patent: Jan. 19, 1993

[54] SILICON-OXY-CARBIDE GLASS METHOD OF PREPARATION AND ARTICLES

[75] Inventors: Gary M. Renlund, Salt Lake City, Utah; Larry N. Lewis, Scotia, N.Y.; Judith Stein, Schenectady, N.Y.; Angelo A. Bracco, Albany, N.Y.

[73] Assignee: General Electric Company, Schenectady, N.Y.

[21] Appl. No.: 574,879

[22] Filed: Aug. 30, 1990

Related U.S. Application Data

[63] Continuation-in-part of Ser. No. 428,711, Oct. 30, 1989, abandoned, and a continuation-in-part of Ser. No. 359,619, Jun. 1, 1989, abandoned, and a continuation-in-part of Ser. No. 386,327, Jul. 28, 1989, Pat. No. 4,981,820.

[51] Int. Cl.$^5$ .............................................. C03C 3/00
[52] U.S. Cl. ...................................... 501/12; 501/11; 264/65
[58] Field of Search ...................... 501/12, 27, 39, 53, 501/55, 82, 84, 87, 88, 89; 264/44, 45.3, 59, 60, 65; 65/30.1, 32.1

[56] References Cited

U.S. PATENT DOCUMENTS

| | | | |
|---|---|---|---|
| Re. 32,107 | 4/1986 | January | 501/12 |
| 2,536,192 | 1/1951 | Littleton | 49/79 |
| 2,544,954 | 3/1951 | Ford | 49/77 |
| 2,556,616 | 6/1951 | Ellis | 250/27.5 |
| 2,596,659 | 5/1952 | D'Eustachio | 49/77 |
| 2,596,669 | 5/1952 | Ford | 106/40 |
| 2,600,525 | 6/1952 | Ford | 106/40 |
| 2,620,597 | 12/1952 | Ford | 49/77 |
| 3,116,137 | 12/1963 | Vasilos et al. | 65/18 |
| 3,348,917 | 10/1967 | Nestor | 23/209.1 |
| 3,378,431 | 4/1968 | Smith, Jr. et al. | 161/1 |
| 3,749,591 | 7/1973 | Hider et al. | 117/21 |
| 3,813,232 | 5/1974 | Forker et al. | 65/23 |
| 3,833,386 | 9/1974 | Wood et al. | 106/41 |
| 4,026,868 | 5/1977 | Merrill | 260/46.5 R |
| 4,116,657 | 9/1978 | Elmer | 65/23 |
| 4,192,664 | 3/1980 | Joshi | 65/22 |
| 4,274,825 | 6/1981 | North | 432/13 |
| 4,547,210 | 10/1985 | Schneider | 65/2 |
| 4,765,818 | 8/1988 | Che et al. | 65/18.1 |
| 4,818,732 | 4/1989 | Fox et al. | 501/81 |
| 4,929,573 | 5/1990 | Atwell et al. | 501/90 |

FOREIGN PATENT DOCUMENTS

| | | |
|---|---|---|
| 107943 | 5/1984 | United Kingdom . |
| 2132603A | 7/1984 | United Kingdom . |
| 2140796A | 12/1984 | United Kingdom . |
| 208343 | 1/1987 | United Kingdom . |

OTHER PUBLICATIONS

"The Vibrational Spectra of High-Purity and Chemically-Substituted Vitreous Silicas", C. F. Smith, Jr., Alfred University, Ph.D. Thesis, 1973, pp. 16-17, 45, 151-152.

"The High-Temperature Oxidation, Reduction, and Volatilization Reactions of Silicon and Silicon Carbide", E. A. Gulbransen, S. A. Jansson, Oxidation of Metals, vol. 4, No. 3, 1972, pp. 181-201.

"Dimethyldiethoxysilane/Tetraethoxysilane Copolymers: Precursors for the Si-C-O System", F. Babonneau, K. Thorne, J. D. Mackenzie, Chemistry of Materials, vol. 1, No. 5, 1989 pp. 554-558.

Hypol Plus Laboratory Procedures and Foam Formulations Technical Brochure, Organic Chemicals Division, W. R. Grace & Co., Lexington, Mass.

Primary Examiner—William R. Dixon, Jr.
Assistant Examiner—Alan Wright
Attorney, Agent, or Firm—James E. McGinness; James C. Davis, Jr.; James Magee, Jr.

[57] ABSTRACT

Methyl silicone resins are pyrolyzed in a non-oxidizing atmosphere to form a translucent glass comprised of silicon, oxygen and carbon where silicon atoms are chemically bonded to carbon and oxygen atoms, but there are essentially no chemical bonds between carbon and oxygen atoms. The translucent silicon-oxy-carbide glasses of this invention resist devitrification and decomposition in oxidizing or reducing atmospheres at temperatures of about 1250° C. or greater. Methods for forming silicon-oxy-carbide glass articles are disclosed, along with specific methods for forming silicon-oxy-carbide glass fibres, composites, and cellular structures.

54 Claims, 6 Drawing Sheets

SILICON-OXY-CARBIDE GLASS METHOD OF PREPARATION AND ARTICLES

This application is a continuation in part of applications Ser. No. 428,711 filed Oct. 30, 1989, now abandoned Ser. No. 359,619 filed June 1, 1989, now abandoned and Ser. No. 386,327 filed July 28, 1989.

BACKGROUND OF THE INVENTION

The present invention relates to glass compositions, methods of forming the glass, and articles comprised of the glass. In particular, the glass compositions of this invention are comprised of silicon, oxygen, and carbon with a substantial portion of the carbon atoms being bonded to silicon atoms.

Amorphous silica is a refractory glass, however, it devitrifies readily at temperatures greater than 1100° C. Devitrification refers to the ordering or crystallization of the random structures that glasses are made of. Crystallization drastically reduces one of the predominant attributes of vitreous silica, i.e., its low thermal expansion, as well as many of its other desirable properties. As a result, much research has been directed to seeking ways to increase the resistance to devitrification in silica glass compositions.

Reactions between silicon, carbon, and oxygen have been studied extensively. Some of the known reactions in a silicon, carbon, and oxygen system include oxygen combining with silicon to form silica, $SiO_2$. At temperatures in excess of 1100° C. silica begins to crystallize to form cristobalite, one of the common mineral forms of silica. Carbon can react with available silica to form crystalline silicon carbide or escape as carbon monoxide gas. Any carbon remaining as elemental carbon readily oxidizes above 600° C. when exposed to air.

The thermodynamics of silicon, carbon and oxygen reactions is discussed in "The High-Temperature Oxidation, Reduction, and Volatilization Reactions of Silicon and Silicon Carbide", Gulbransen, E. A., and Jansson, S. A. Oxidation of Metals, Volume 4, Number 3, 1972. The thermodynamic analysis of Gulbransen et al. shows that at 1200° C. silica and carbon should form gaseous silicon monoxide and carbon monoxide or solid silicon carbide, SiC. However, no material containing silicon, oxygen and carbon would be expected to form. Gulbransen et al. conclude that silica was not recommended for use in reducing atmospheres above 1125° C. due to the formation of volatile silicon monoxide gas. Also silicon carbide was not recommended for use in oxygen containing environments where active oxidation may occur due to oxidation of the silicon carbide.

There is an opaque, black, glass that is functionally described as carbon modified vitreous silica and herein referred to as "black glass" where 1-3 percent carbon has been added to silica. The method for making black glass is disclosed by Smith et al. in U.S. Pat. No. 3,378,431. Carbonaceous organics such as carbowax are added to silica and the mixture is hot pressed at about 1200° C. to form black glass. Smith, C. F., Jr. has further characterized black glass by infrared spectroscopy in "The Vibrational Spectra of High Purity and Chemically Substituted Vitreous Silicas", PhD Thesis, Alfred University, Alfred, N.Y., May 1973. Smith discloses that in addition to elemental carbon dispersed in the glass, carbon in black glass is associated with oxygen in carbonato type groups. A carbonato group is the description of a particular way that a carbon atom bonds with three oxygen atoms and has the structure,

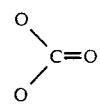

The mechanical strength of black glass is similar to the strength of carbon free silica glass, however, black glass has an increased resistance to devitrification over conventional silica glass which begins to devitrify at about 1100° C. while black glass begins to devitrify at about 1250° C. The increased thermal stability of black glass allows it to be used at temperatures higher than vitreous silica can withstand.

In a commercially produced continuous silicon carbide ceramic fibre sold under the trademark "Nicalon", about 10 percent oxygen is introduced into the fibre to crosslink it. After crosslinking, the fibres are pyrolized and it is believed that the oxygen becomes part of the fibre as an amorphous contaminant, probably in the form of silica. The degradation behavior of such fibres after heat treatment in various environments was reported in the article "Thermal Stability of SiC Fibres (Nicalon ®)", Mah, T., et al., Journal of Material Science, Vol. 19, pp. 1191-1201 (1984). Mah et al. found that regardless of the environmental conditions during heat treatment, the "Nicalon" fibre strength degraded when the fibres were subjected to temperatures greater than 1000° C. The fibre degradation was associated with loss of carbon monoxide from the fibres and beta-silicon carbide grain growth in the fibres.

Ceramic materials generally exhibit brittle behavior as characterized by their high strength and low fracture toughness. Fracture toughness is the resistance to crack propagation in materials. The development of ceramic composites has been investigated as a way to alleviate the brittle behavior of ceramics. "Nicalon" is an excellent ceramic fibre but it degrades at temperatures above 1200° C. Integrating "Nicalon" fibres in a protective ceramic matrix having desirable mechanical properties and capable of withstanding temperatures substantially higher than 1200° C., would be one way of forming an improved ceramic composite. However, from the discussion above, it is apparent that the properties of known ceramic or glass compositions, and specifically those containing silicon, oxygen and carbon, are degraded by decomposition or devitrification of the glass or ceramic at temperatures above 1100° C. to 1250° C.

Therefore, it is an object of this invention to form glass compositions, comprised of chemically bonded silicon, oxygen and carbon wherein a substantial portion of the carbon atoms are bonded to silicon atoms, and the glass is formed from select methyl silicone resins.

It is another object of this invention to form a translucent glass, comprising chemically bonded silicon, oxygen and carbon wherein a substantial portion of the carbon atoms are bonded to silicon atoms with up to trace amounts of elemental carbon dispersed in the glass matrix. Such glass compositions remain structurally stable and do not decompose in oxidizing or reducing atmospheres at temperatures up to at least 1600° C.

Another object of this invention is a process for forming such glasses comprised of silicon, oxygen and carbon by pyrolizing select methyl silicone resins.

Still another object of this invention is the formation of such a glass comprised of silicon, oxygen and carbon into articles.

BRIEF DESCRIPTION OF THE INVENTION

We have found that some silicone resins can be pyrolized in a non-oxidizing atmosphere to form unique glass compositions. Surprisingly, we have found that these silicone resins when pyrolized in a non-oxidizing atmosphere do not form silica, cristobalite, silicon carbide, carbon monoxide or mixtures of silica and carbon. In addition, we have found select silicone resins that pyrolize to form translucent glass compositions containing up to trace amounts of free carbon that permit at least the partial transmission of light through the glass so that the glass is not opaque or black in appearance.

Glasses of this invention are made by pyrolizing a methyl silicone resin to form a glass composition, comprising silicon, oxygen, and carbon wherein a significant portion of the carbon atoms are chemically bonded to silicon atoms. According to one method of this invention, a methyl silicone resin is heated in a non-oxidizing atmosphere to pyrolize the resin. As used herein, a non-oxidizing atmosphere is an atmosphere that will remove reaction products from the pyrolizing resin without influencing the reactions occurring during pyrolysis. Examples of such non-oxidizing atmospheres are inert atmospheres like helium, argon, or nitrogen, and reducing atmospheres, such as hydrogen. Pyrolysis may also occur in a vacuum having a pressure below about $10^{-4}$ atmospheres.

Methyl silicone resins suitable for use in the method of this invention can be prepared by the methods described in U.S. Pat. Nos. 2,676,182, and 4,026,868 which are incorporated by reference herein. In particular, examples 2 and 4 in the '182 patent modified by replacing ethanol with alcohols, and replacing dimethylphenylchlorosilane and trimethylethoxysilane with trimethylchlorosilane, and the use of toluene to aid in the hydrocarbon separation is relevant for preparing some of the methyl silicone resins used in the method of this invention.

Methyl silicones are made up of siloxane chains with methyl groups attached to the silicon atoms. Siloxane chains contain an alternating linkage of silicon and oxygen atoms. Several combinations of methyl groups can be present on the siloxane chains to form polymethylpolysiloxanes.

The basic unit structures in polymethylpolysiloxanes are trimethylsiloxy, dimethylsiloxy, and monomethyl siloxane. The trimethylsiloxy monofunctional unit at the end of a siloxane chain has the structure;

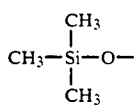

Dimethylsiloxy is a difunctional unit that builds chains or rings and has the structure;

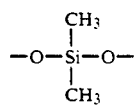

Monomethyl siloxane is a trifunctional unit and not only extends siloxane chains, but also crosslinks between chains and has the structure;

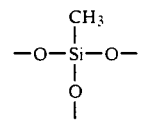

Methyl silicone resins may also contain unsubstituted tetrafunctional units, herein referred to as Q units, and having the structure;

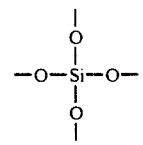

Polymeric structures can be built from these unit structures to form polymethylpolysiloxanes having a desired number of methyl groups per silicon atom. By varying the ratio of methyl groups to silicon atoms, different methyl silicone resins are formed having more or less organic substituent, the organic substitution being the methyl groups. Methyl silicone resins generally contain a ratio of methyl groups to silicon atoms of about 2:1 or less. Some of the methyl silicone resins used in this invention consist of, trimethyl-siloxy and the unsubstituted tetrafunctional Q unit in ratios up to the maximum amount of trimethylsiloxy that can be polymerized with Q units or up to about 3:1, preferably in the ratio of about 0.7:1 up to about 3:1 and most preferably in the ratio of about 1:1 up to about 3:1. Such methyl silicone resins are hereafter referred to as MQ methyl silicone precursor resins, or sometimes as the MQ precursor resins, or MQ resins. It should be understood that the ratio of trimethylsiloxy to Q units in the precursor resins described above is specified according to the initial stoichiometry of the resin as prepared by the processes described above, however the polymerized ratio of trimethylsiloxy to Q units can be lower in the resin. The MQ resins are made by the method disclosed in the '182 patent.

Another methyl silicone resin used in this invention consists of, by weight percent, about 5 percent dimethylsiloxy and about 95 percent monomethylsiloxy and is hereafter referred to as a DT methyl silicone precursor resin, or sometimes as the DT precursor resin, or DT resin. The DT resins are made by the method in the '868 patent.

During pyrolysis, the precursor resin densifies as gases are evolved causing a weight loss from the resin. Although the pyrolizing resin experiences a weight loss the density of the pyrolizing resin is increasing due to a reduction in volume of the pyrolizing resin. The pyrolysis reactions are essentially completed when a substantially constant weight was achieved in the pyrolizing resin. Further densification of the pyrolizing resin may occur after weight loss has ended, if heating is continued. Therefore, it sometimes may be desirable to stop heating and pyrolysis of the resin after it has completely densified, or in other words, stops reducing in volume. Weight loss during pyrolysis was determined to be from about 11 to 54 percent. Methyl silicone precursor resins can be pyrolized at temperatures ranging from about 900° C. to 1600° C.

Glasses formed by the method of this invention possess unique properties and characteristics. These glasses both resist crystallization and do not decompose in oxidizing or reducing atmospheres at temperatures up to at least 1600° C. In addition, a significant portion of the carbon present in the glasses of this invention is bonded to silicon with the remainder present as elemental carbon dispersed within the glass matrix so that there are no detectable carbonato groups. The carbon-silicon bonds discovered in the glasses of this invention have heretofore been unknown in silica glasses. In silica glasses, and specifically in black glass, carbon has only been known to be present as an unbonded element in the silica matrix or in carbonato groups where carbon is bonded with oxygen. Glasses formed by the method of this invention and characterized by such unique properties are herein referred to as silicon-oxy-carbide glass.

Pyrolysis of the methyl silicone precursor resin forms a silicon-oxy-carbide glass that is characterized by a continued sharing of electrons between atoms of silicon, oxygen and carbon. In silicon-oxy-carbide glass, silicon atoms are present in four polyatomic units. In one unit, herein referred to as tetraoxysilicon, a silicon atom is bonded to four oxygen atoms. In a second unit, herein referred to as monocarbosiloxane, a silicon atom is bonded to three oxygen atoms and one carbon atom. In a third unit, herein referred to as dicarbosiloxane, a silicon atom is bonded to two oxygen atoms and two carbon atoms. In a fourth unit, herein referred to as tetracarbosilicon, a silicon atom is bonded to four carbon atoms.

Silicon-oxy-carbide glass is formed by pyrolysis of precursor resins containing trimethylsiloxy and Q units polymerized in any ratio, but, surprisingly, we have found that the ratio of trimethylsiloxy polymerized to Q units in the MQ precursor resin has an effect on the composition and properties of the silicon-oxy-carbide glass that is formed. When MQ precursor resins containing trimethylsiloxy and Q units in a ratio below the preferred MQ precursor resins described above, or, in other words, MQ precursor resins having an M to Q ratio below about 0.7:1 are used, an opaque silicon-oxy-carbide glass is formed that is black in appearance.

When the preferred MQ precursor resins containing trimethylsiloxy and Q units in the ratio of 0.7:1 or greater are pyrolized, a translucent silicon-oxy-carbide glass is formed having at least a distribution of polyatomic units comprising in weight percent, about 18 to 28 percent tetraoxysilicon, about 21 to 31 percent monocarbosiloxane, about 12 to 22 percent dicarbosiloxane, about 28 to 38 percent tetracarbosilicon, with up to trace amounts of elemental carbon dispersed atomically or in small clusters within the glass matrix. A trace amount of elemental carbon is an amount that is insufficient to make the glass opaque, or in other words, permits at least the partial transmission of light through the glass. Generally, a trace amount of elemental carbon is less than about 0.1 weight percent. The polyatomic units are linked primarily by silicon-oxygen bonds with a small and insignificant number of bonds between carbon and oxygen atoms.

The translucent glass can alternatively be described as a composition of silicon, oxygen, and carbon in a mass of translucent silicon-oxy-carbide glass wherein about 73 to 83 percent of the silicon atoms are each bonded to at least an individual carbon atom, with up to trace amounts of elemental carbon dispersed atomically or in small clusters within the glass matrix.

The pyrolized DT precursor resin forms a glass having a distribution of the polyatomic units in a matrix, comprising in weight percent about 34 to 44 percent tetraoxysilicon, about 19 to 29 percent monocarbosiloxane, about 17 to 27 percent dicarbosiloxane, up to about 6 percent tetracarbosilicon, and about 3 to 9 percent elemental carbon dispersed atomically or in small clusters within the glass matrix. Glasses formed from the pyrolized DT resins are opaque.

The glass formed from the DT resin can alternatively be described as a composition of silicon, oxygen, and carbon in a mass of silicon-oxy-carbide glass wherein about 52 to 62 percent of the silicon atoms are bonded to at least one carbon atom, and about 3 to 9 weight percent carbon is present as elemental carbon dispersed atomically or in small clusters within the glass matrix.

Articles of silicon-oxy-carbide glass can be formed by pulverizing the pyrolized resin into a powder. The silicon-oxy-carbide powder is then consolidated by hot pressing to form an article. One method for hot pressing is to apply a uniaxial pressure of at least about 5 ksi at about 1550° C. to 1600° C. to the powder. The unit ksi is kips per square inch; the equivalent of 1000 pounds per square inch. Such pressures and temperatures are sufficient to form a densified article.

Shaped articles can be formed directly from the DT methyl silicone precursor resin. First the DT resin was crosslinked by dissolving the resin in a solvent such as toluene and then adding a curing agent such as gamma amino propyl triethoxy silane. The solution was cast into a desired shape and dried and cured at room temperature. The crosslinked DT resin was slowly pyrolized in a non-oxidizing atmosphere as described herein. Pyrolysis is performed at a low rate of heating that avoids formation of voids and bubbles as gases evolve and cause a weight loss in the resin. When the weight of the pyrolizing resin stabilizes, pyrolysis is complete. The crosslinked DT resin densifies to form a silicon-oxy-carbide glass having a distribution of polyatomic units, comprising in weight percent about 38 to 48 percent tetraoxysilicon, about 11 to 21 percent monocarbosiloxane, about 11 to 21 percent dicarbosiloxane, about 12 to 22 percent tetracarbosilicon, and about 3 to 9 percent elemental carbon dispersed atomically or in small clusters within the glass matrix. The silicon-oxy-carbide glass formed from a crosslinked DT precursor resin is herein referred to as crosslinked resin silicon-oxy-carbide glass.

Crosslinked resin silicon-oxy-carbide glass can alternatively be described as a composition of silicon, oxygen, and carbon in a mass of silicon-oxy-carbide glass wherein about 54 to 64 percent of the silicon atoms are bonded to at least one carbon atom, and about 3 to 9 weight percent carbon is present as elemental carbon dispersed atomically or in small clusters within the glass matrix.

The DT precursor resin can be crosslinked to any partial degree of the fully crosslinked state. Such partially crosslinked resins can be pyrolized according to the method of this invention to form silicon-oxy-carbide glass compositions intermediate to the compositions described above. Therefore, silicon-oxy-carbide glasses can be formed having a distribution of polyatomic units, comprising in weight percent about 34 to 48 percent tetraoxysilicon, about 11 to 29 percent monocarbosiloxane, about 11 to 27 percent dicarbosiloxane, up to about 22 percent tetracarbosilicon, and about 3 to 9 percent elemental carbon dispersed atomically or in small clusters within the glass matrix.

Alternatively, such silicon-oxy-carbide glasses can be described as a composition of silicon, oxygen, and carbon in a mass of silicon-oxy-carbide glass wherein about 52 to 64 percent of the silicon atoms are bonded to at least one carbon atom, and about 3 to 9 weight percent carbon is dispersed atomically or in small clusters within the glass matrix.

Shaped articles can be formed directly from the MQ methyl silicone precursor resin. First, the MQ resin is dissolved in a solvent such as toluene and then cast into a desired shape. The cast resin is dried at room temperature and slowly pyrolized in a non-oxidizing atmosphere as described herein. Pyrolysis is performed at a low rate of heating that avoids formation of voids and bubbles as gases evolve and cause a weight loss in the resin. When the weight of the pyrolizing resin stabilizes, pyrolysis is complete. When the preferred MQ precursor resins described above are pyrolized, the cast resin densifies to form a translucent silicon-oxy-carbide glass having at least a distribution of polyatomic units as described above, however when the MQ precursor resins having a ratio of trimethylsiloxy to Q units of less than 0.7:1 are pyrolized the cast resin densifies to form an opaque silicon-oxy-carbide glass that is black in appearance.

The crosslinking DT precursor resin solution can also be drawn into fibres. The DT precursor resin solution is allowed to crosslink until the viscosity increases to a point where a solid object can be dipped into the solution. Fibres can then be drawn or pulled from the resin solution by such dipping processes. Alternatively, the resin solution can be drawn into a teflon tube with a slight vacuum. As the resin cures and toluene evaporates the fibre shrinks and can be pushed out of the tube. Fibres can be fully crosslinked for easier handling by heating them to about 50.C. The fibres are then pyrolized in a non-oxidizing atmosphere or a vacuum as described above.

The MQ precursor resin in a toluene solution may be drawn into fibres by treating the MQ precursor resin solution with a base or acid to increase the viscosity to a point where a solid object can be dipped into the solution and withdrawn, pulling a strand of the resin from the solution. The above described fibre making process is then repeated.

Ceramic composites may be formed having ceramic fibres in a matrix of silicon-oxy-carbide glass and ceramic filler. The DT or MQ precursor resin is dissolved in a solvent and ceramic particles are dispersed in the solution to form an infiltrant slurry. The particulate ceramic filler controls shrinkage of the composite matrix during pyrolysis and can be chosen so the matrix is compatible with the fibre reinforcement to be used. Some examples of ceramic fillers are powdered silicon carbide, diatomaceous earth and the $2SiO_2.3Al_2O_3$ aluminosilicate referred to as mullite.

A ceramic fibre or fibres, or a cloth of the fibres is drawn through an agitated bath of the infiltrant slurry. Some examples of ceramic fibres are carbon fibre, silicon carbide fibre and alumino-boro-silicate fibres. The impregnated fibre is then shaped and dried to allow evaporation of the solvent. One shaping method includes winding an impregnated fibre spirally on a drum to form a panel. Layers of the fibre can be consolidated through the application of heat and pressure to form a continuous resin matrix surrounding the ceramic fibres. The composite is then pyrolized in a non-oxidizing atmosphere or a vacuum as described above. The resin densifies into a substantially amorphous silicon-oxy-carbide glass that binds the ceramic filler, thus forming a continuous matrix around the fibres. Depending on the pyrolysis temperature used, the ceramic filler may be dispersed, partially sintered or fully sintered within the glass.

Optionally, the ceramic composite can be reinfiltrated with a solution of precursor resin dissolved in a solvent to reduce porosity in the composite. The composite is placed in the re-infiltrant solution while in a vacuum. Pressure is applied to the solution to force the solution into the pores of the composite. After re-infiltrating, the solvent is allowed to evaporate and the re-infiltrated composite is pyrolized in a non-oxidizing atmosphere or vacuum as described above. Re-infiltration and pyrolysis can be repeated as often as needed to achieve the desired degree of density in the matrix. The matrix of amorphous silicon-oxy-carbide glass binding a ceramic filler surrounds and protects the ceramic fibres from decomposition in oxidizing and reducing atmospheres at temperatures up to at least 1600° C. It was found that the inert nature of silicon-oxy-carbide glass readily accepts ceramic fibres without reacting with them and degrading their properties. As a result, silicon-oxy-carbide glass containing appropriate ceramic fillers can be used as a matrix material for many known ceramic fibres.

BRIEF DESCRIPTION OF THE DRAWINGS

The following description of the invention will be more easily understood by making reference to the FIGS. briefly described below.

DETAILED DESCRIPTION OF THE INVENTION

Figure 1:
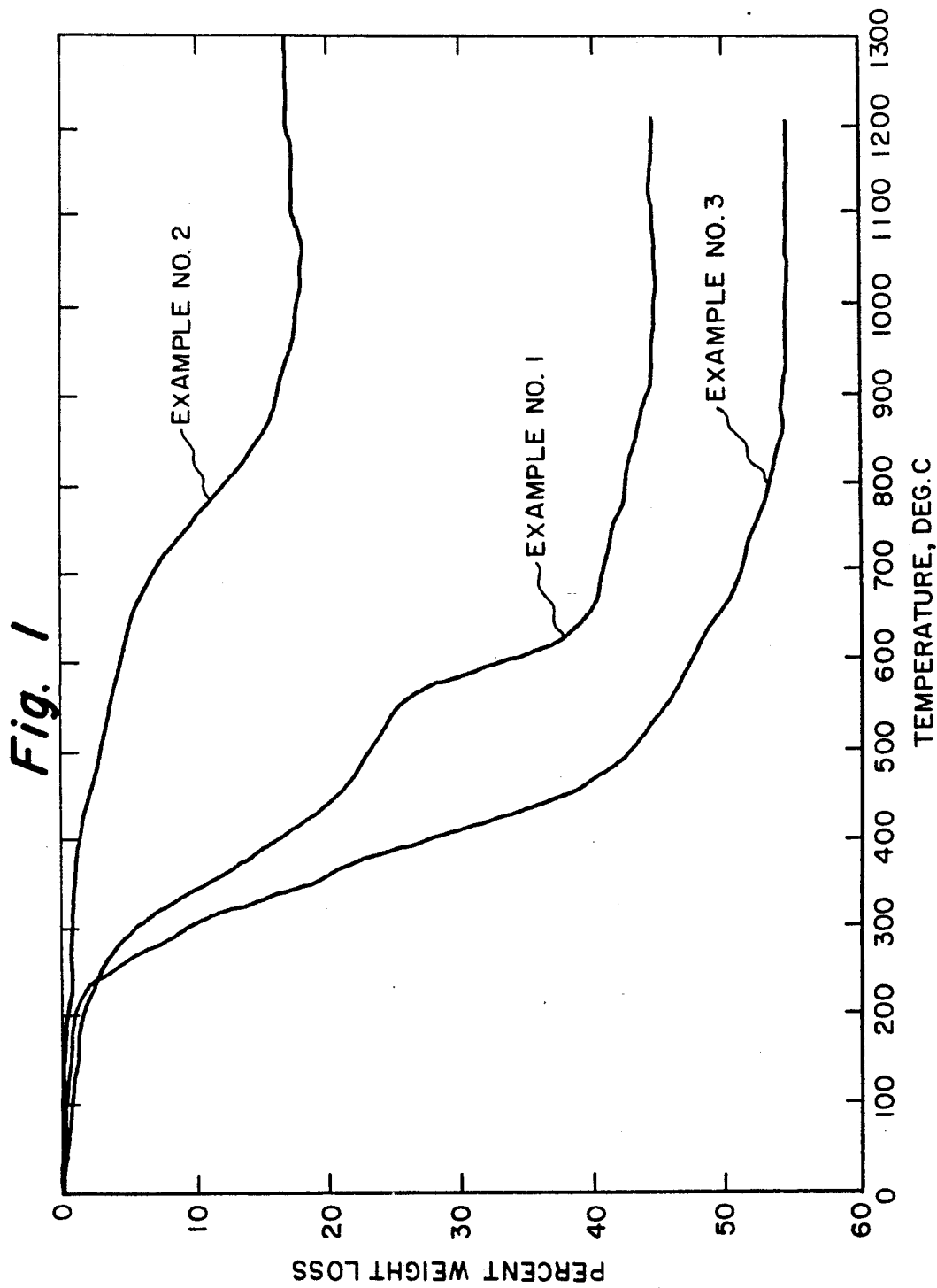
FIG. 1 is a graph showing the weight lost during pyrolysis of MQ methyl silicone precursor resins.

Glasses can be defined by two of their basic features; one feature being that glasses are formed from an extremely viscous supercooled liquid, and a second feature being that the liquids which form glasses possess a polymerized network structure with short-range order. The glasses of this invention are not made from supercooled liquids, but they do possess a network structure with short-range order. Instead of supercooling a liquid, the glasses of this invention are formed by pyrolizing a methyl silicone precursor resin in a non-oxidizing atmosphere. However, the glasses of this invention have the short-range ordering characteristic of conventional glasses.

The preferred DT methyl silicone resin used in this invention is predominantly comprised of monomethylsiloxane units many of which units contain a hydrogen atom on one oxygen atom, i.e., a hydroxyl group. Crosslinking occurs in the resin when hydroxyl units combine to form a bond between silicon and oxygen and generate water. It has been found that other silicone resins made according to the methods in the '182 and '868 patents can be pyrolized to form unique carbonato-free glasses comprising silicon, oxygen and carbon wherein carbon is bonded to silicon and some elemental carbon may be present in the glass matrix.

Silicone resins have a three dimensional structure with short-range order and silicone resins can be described in terms of their stoichiometric compositions. The stoichiometric units in silicone resins contain a silicon atom bonded to oxygen atoms and radical groups. Radical groups in silicone resins that may be pyrolized to form glasses are formed from the monovalent hydrocarbon radicals and halogenated monovalent hydrocarbon radicals including alkyls; such as methyl, ethyl, propyl, isopropyl, butyl, octyl, dodecyl, and the like; cycloalkyls, such as cyclopentyl, cyclohexyl, cycloheptyl, and the like; aryls such as phenyl, naphthyl, tolyl, xylyl, and the like; aralkyls, such as benzyl, phenylethyl, phenylpropyl, and the like; halogenated derivatives of the aforesaid radicals including chloromethyl, trifluoromethyl, chloropropyl, chlorophenyl, dibromophenyl, tetrachlorophenyl, difluorophenyl, and the like; and alkenyls, such as vinyl, allyl, methallyl, butenyl, pentyl, and the like.

The four basic units in silicone resins are herein referred to as M groups in which a silicon atom is bonded to one oxygen atom and three organic radicals, D groups in which a silicon atom is bonded to two oxygen atoms and two organic radicals, T groups in which a silicon atom is bonded to three oxygen atoms and one organic radical, and Q groups in which the silicon atom is bonded to four oxygen atoms. Silicone resins that may be pyrolized to form glasses contain a combination of M, T, D, and Q groups so that the ratio of organic radicals to silicon atoms is between about 0.5:1 and less than about 3:1.

The glasses of this invention resist devitrification, and remain structurally stable at temperatures up to at least 1600° C. The term "structurally stable" refers to a bulk material that essentially retains the same microstructure from room temperature up to the elevated temperatures indicated. This means that minor changes may occur in the microstructure. Minor changes, such as the formation of small crystallized areas up to about 100 angstroms in an otherwise amorphous matrix have substantially no adverse or deleterious effect on the properties of the bulk material. Therefore, structurally stable glasses of the present invention are essentially amorphous but may contain small crystallized areas of, for example, graphite, cristobalite or silicon carbide within the glass, or display minor amounts of cristobalite on the surfaces of the glass.

Silicon-oxy-carbide glass articles, can be made according to several methods in this invention. In one method, the pyrolized resin is pulverized into a powder having a particle size ranging from 0.1 up to 2 microns. Grinding mills, such as an attritor or planetary mill, have been used to produce silicon-oxy-carbide particle sizes of 0.1 to 2 microns. Attritor milling is performed by impellor stirring of a solution comprised of about 52 percent liquid, such as water, about 35 percent milling media, such as 1.2 mm diameter balls that are harder than the material to be ground, and the remainder is crushed particles of silicon-oxy-carbide glass. Impellor stirring of the solution at 1000 rpm pulverizes the glass particles into a powder. Planetary milling is performed with a similar solution except the milling media are 5 to 8 mm diameter balls and the solution is agitated by rotating the milling vessel in a planetary fashion at slower speeds.

The milled powder is then dried and consolidated by application of heat and pressure to form a shaped article. Consolidation can be achieved through application of a uniaxial pressure of at least about 5 ksi at about 1550° C.–1600° C., or application of isostatic pressure of at least about 8 ksi at about 1200° C. to 1600° C. Heat and pressure are applied until the article has been densified the desired amount or until fully densified.

In another method for forming silicon-oxy-carbide glass articles from cast or shaped precursor resins, the DT methyl silicone precursor resin can be dissolved in a solvent and crosslinked with a curing agent. Illustrative of the solvents that have been found suitable for dissolving the precursor resin are toluene and mixtures of toluene with isopropyl alcohol. The resin can be dissolved in the solvent at ratios up to about eight parts resin to five parts solvent. Illustrative of the curing agents found suitable for crosslinking the precursor resin are bases such as ammonium hydroxide, commercial silicon containing amines such as gamma amino propyl triethoxy silane and acids such as hydrochloric acid. The curing agent is added in an amount of about 0.1 to 4 percent of the resin. The crosslinked precursor resin is dried and cured at room temperature. Preferably, the crosslinked precursor resin is dried at a rate that allows solvent to evaporate from the resin without forming voids in the resin. The precursor resin is shaped or cast into the desired form either before or during crosslinking.

The cured DT precursor resin was then pyrolized in a non-oxidizing atmosphere as described herein. Since the precursor resin is crosslinked in this embodiment of the invention, pyrolysis can also be performed in a vacuum. The heating rate during pyrolysis must be controlled to allow evolution of gases without forming voids or bubbles in the resin. Preferably heating rates of less than 1.0° C. per minute are used to allow sufficient gas evolution without forming bubbles, voids or defects in the glass. Pyrolysis was complete when weight loss from the evolution of water, methyl groups and other decomposition products from the precursor resin substantially ended. The precursor resin densifies during pyrolysis and forms the crosslinked resin silicon-oxy-carbide glass.

In another method for forming silicon-oxy-carbide glass articles from cast or shaped precursor resins, the MQ methyl silicone precursor resin is dissolved in a solvent and cast into the desired form. Illustrative of the solvents that have been found suitable for dissolving the precursor resin are toluene and mixtures of toluene with isopropyl alcohol. MQ precursor resins can be dissolved in the solvent at ratios up to about eight parts resin to five parts solvent. The cast precursor resin is dried at room temperature. Preferably, the cast precursor resin is dried at a rate that allows solvent to evaporate from the resin without forming voids in the resin. For example, a rate of evaporation that inhibits void formation in the drying resin was established by placing the resin solution in a cylindrical dish open at one end and placing a piece of paper over the open end. Alternatively, the precursor resin, which is normally in the form of a powder, can be shaped by hot pressing. The cast precursor resin is then pyrolized in a non-oxidizing atmosphere as described herein.

In another embodiment, the MQ and DT precursor resins are foamed to form cellular glass structures. One method for foaming the precursor resin is to dissolve it in a nonpolar organic solvent, intimately mix the dissolved resin with a foaming agent, and react the foaming agent by stirring water into the mixture. When the DT methyl silicone resin described above is used, a curing agent for the precursor resin can also be added to the resin mixture before the water is added to react the foaming agent.

A suitable foaming agent is an isocyonate capped polyoxyethylene polyol reaction product having an average isocyonate functionality greater than 2 and up to about 6 or more. Methods for making such isocyonate capped polyoxyethylene polyol reaction products are disclosed in U.S. Pat. No. 3,833,386, incorporated by reference herein. A nonpolar organic solvent such as toluene, and a curing agent such as a silicon containing amine can be used as the other additives in the resin solution.

Additives in the precursor resin solution are added in the amounts of; about one part foaming agent to about 0.2 to two parts resin, the nonpolar organic solvent is present in an amount that will at least dissolve the resin and up to an amount that does not dilute the foaming agent so that it does not foam properly, such amounts of solvent are about 10 to 50 weight percent of the foaming agent, the curing agent is about 0.1 to 4 weight percent of the resin and is added preferably when the first methyl silicone resin described above is used, and water is stirred into the solution in the amount of about 2 to 250 percent by weight of the foaming agent. Stirring continues until the solution turns creamy, at which time foaming and crosslinking of the foaming agent begins. The water added to the precursor resin solution reacts with the foaming agent to form a hydrophilic crosslinked polyurethane foam. The polyurethane foam acts as a carrier for the precursor resin so that the resin is uniformly disposed throughout the foamed structure as a continuous separate phase.

Illustrative of the nonpolar organic solvents found to be acceptable are toluene, acetone, freon or methylene chloride, polar organic solvents, such as alcohol, cannot be used. Illustrative of the resin curing agents that were found acceptable are silicon containing amines such as gamma aminopropyltriethoxysilane, bases such as ammonium hydroxide, and acids such as hydrochloric acid.

In the above method, two separate polymerization reactions are made to occur in a specific order while avoiding interference in the separate reactions. The foaming agent must polymerize first to form the polyurethane foam without being affected by the precursor resin or the polymerization reaction of the precursor resin. For example, if the precursor resin crosslinks too quickly, the foaming reaction is restricted and the polyurethane foam will not form properly. The precursor resin, solvents, curing agents and the amounts of each of the additives specified in the method above have been found to not interact with the foaming agent so that when mixed together the polyurethane foam is formed and the resin is distributed as a continuous separate phase in the foam.

Solid particulated or fiberous fillers such as catalysts, ceramics, silica, diatomaceous earth or alumina can be added to the resin prior to foaming to impart additional thermal, electrical or other desired properties to the cellular glass structure. When fillers are added to the precursor resin solution, the precursor resin can be added in amounts from about one part foaming agent to 0.05 to 1 part resin.

Commercially produced surfactants sold under the trademark "Pluronic" polyols may be added to the solution to modify cell size, foam rise height, and relative amounts of closed or open cells in the foam. Such surfactants may be added in amounts up to 10 weight percent of the foaming agent.

The initial temperature of the resin solution can be controlled by preheating each additive before it is added to the solution. Higher solution temperatures cause the foaming action to increase and produce a larger cell size in the foam. Sufficient foaming occurs with solution temperatures of 0° C. to 95° C. Because the foaming reaction is exothermic, the solution temperature increases after foaming begins.

When foaming is complete, the foaming agent has formed a hydrophilic crosslinked polyurethane foam structure, sometimes herein referred to as a carrier foam, capable of supporting the precursor resin in a foamed structure. The foamed structure is dried to evaporate water and the organic solvent. Drying may be conducted from room temperature to just below the flash point temperature of the organic solvent. While the foamed structure is drying, the precursor resin is crosslinked to retain the foamed structure without the support of the carrier foam.

The polyurethane is then removed from the foamed structure by heating between about 150° C. to 400° C. Such heating decomposes the polyurethane and can be carried out in an atmosphere that removes the vaporizing polyurethane, water and organic solvent without contributing to other reactions in the resin. Inert atmospheres, air or a vacuum can be used.

The foamed precursor resin is then pyrolized by heating to between about 900° C. and 1600° C. in a non-oxidizing atmosphere. Preferably, heating rates of less than about 1° C. per minute are used to allow sufficient evolution of the decomposition products without introducing bubbles, voids or defects in the glass cell walls. During pyrolysis the foamed resin densifies into a cellular glass structure as water, methyl groups and other decomposition products from the resin evolve and produce a weight loss in the resin. Heating is stopped when a substantially constant weight is achieved in the pyrolizing resin. It should be understood that the cellular structure of the foamed resin is retained, it is the resin that densifies forming essentially fully dense cell walls in the cellular structure. Further densification of the pyrolyzing resin may occur after weight loss has ended, if heating is continued. Therefore, it sometimes may be desirable to stop heating and pyrolysis of the resin after it has completely densified, or in other words, stops reducing in volume. Weight loss during pyrolysis was determined to be from about 11 to 80 percent. It was found that the methyl silicone precursor resins could be pyrolized at temperatures ranging from about 900° C. to 1600° C.

The precursor resin is pyrolized to form an essentially fully dense cellular silicon-oxy-carbide glass structure, and the cellular glass structures of this invention will have greater strength than sintered ceramic cellular structures that inherently contain up to 10 percent porosity in the sintered cell walls of the ceramic. When particulated fillers are added to the precursor resin, they are uniformly distributed in the cellular silicon-oxy-carbide glass because it is amorphous and there is little resistance to mass transport of such second phase particles. By choosing ceramic fillers that sinter at the pyrolizing temperatures a cellular structure of sintered ceramic bound by silicon-oxy-carbide glass can be formed.

The durability of the cellular silicon-oxy-carbide glass will also be improved over prior art cellular glass structures since it does not contain alkalis or alkaline earths that have been found to leach out in agencies such as water at elevated temperatures, causing disintegration or deterioration of prior art cellular glasses.

An important property of foamed structures is the content of closed or open cells in the foam. For example, if the polymerization of the foaming agent is complete before foaming is complete, split or open cells will be produced in the foam. A foam having all closed cells will have good insulating and buoyant float properties, while foams having open cells will have better filtering and sound-absorbing characteristics. A foam containing a catalyst as a filler in the foam and having open cell walls would form a catalyzing surface for fluids or gases passing over or through the foam. Cellular silicon-oxy-carbide glasses having open cells may also be used as molten metal filters or exchange columns in chemical processes.

The content of closed cells or open cells in the foam can be controlled by using surfactants. "Pluronic" polyol surfactants may be added to the solution before the water is added to modify cell size and foam rise height as well as the open cell content in the foam. The synthesis of "Pluronic" polyol surfactants manufactured by BASF Wyandotte Corporation and used in the following examples is initiated by the controlled addition of propylene oxide to the two hydroxyl groups of a propylene glycol initiator. The resulting hydrophobe can be tailored to any desired length, varying from 800 to several thousands in molecular weight. A block copolymer is formed between the hydrophobic ethylene oxide base and the hydrophylic polyoxyethylene groups which are controlled in length to constitute from 10 percent to 80 percent by weight of the final molecule. Surfactants may be added in amounts up to 10 weight percent of the foaming agent.

EXAMPLES

The following examples are offered to further illustrate the silicon-oxy-carbide glass of this invention and methods for producing the glass and glass articles. In the following examples, MQ precursor resins formed by the method described above in the '182 patent and having methyl radical groups were used, with a first MQ resin consisting of M and Q units in a ratio of about 0.5:1, a second MQ resin had a ratio of 1:1, a third MQ resin had a ratio of 2:1, and a fourth MQ resin had a ratio of 3:1. The MQ resins were used in Examples 1-4, 11, and 15. The silicone resin formed by the method in the '868 patent and having methyl radical groups, and consisting of about 5 weight percent D groups and 95 weight percent T groups was used in Examples 5-7, 8-10, 12, 13, and 16-19.

Methyl silicone precursor resins were pyrolyzed by heating them to temperatures ranging from 1100° C. to 1250° C. in a non-oxidizing atmosphere. During pyrolysis, the precursor resins experienced weight loss as water, methyl groups, and other decomposition products evolved. When the weight of the pyrolizing resin stabilizes, pyrolysis is substantially complete. However, after the weight loss has ended, some densification of the silicon-oxy-carbide glass can occur; therefore, heating and pyrolysis may continue until the silicon-oxy-carbide glass is fully densified. Measured weight loss during pyrolysis varied from about 11 to 54 percent. Part of the weight loss can be attributed to variations in the amount of retained solvents, and the amount of water generated during crosslinking of the DT resins that has occurred prior to the beginning of pyrolysis. As explained previously the DT precursor resins evolve water as they crosslink. The DT resins will crosslink at room temperature or when curing aids are added to increase crosslinking. Therefore, the amount of water evolved from the DT resin before the beginning of pyrolysis may vary depending upon the amount of crosslinking that has occurred prior to pyrolysis. As more crosslinking occurs more water is lost before pyrolysis and there will be lesser amounts of weight loss from DT resins during pyrolysis.

EXAMPLES 1-4

The first, second, third and fourth MQ resins described above were pyrolized according to the method of this invention while weight loss from the resins was measured by thermal gravimetric analysis. Thermal gravimetric analysis is a method for measuring weight loss from a sample while it is being heated. The samples were heated in a hydrogen atmosphere at a rate of 10° C./minute to a temperature of 1250° C. The measured weight loss for each silicon-oxy-carbide glass formed after pyrolysis is shown in Table I. Unexpectedly, the second, third and fourth precursor resins consisting of M and Q units in a ratio of 1:1, 2:1, and 3:1 were found to form a translucent glass after pyrolysis. The first resin having an M to Q ratio of about 0.5:1 was opaque and black in appearance after pyrolysis. Therefore, it is believed that precursor resins having an M to Q ratio of about 0.7:1 or greater will form translucent silicon-oxy-carbide glasses, while precursor resins having an M to Q ratio below about 0.7:1 will form opaque silicon-oxy-carbide glasses.

TABLE I

| | Thermal Gravimetric Analysis of Pyrolized Resins | | | |
|---|---|---|---|---|
| Example No. | Sample Precursor Resin | Atmosphere | Weight Loss % | Pyrolized Glass Appearance |
| 1 | $M_{0.5}Q$ | $H_2$ | 45 | Black |
| 2 | MQ | $H_2$ | 17.5 | Translucent |
| 3 | $M_2Q$ | $H_2$ | 54 | Translucent |
| 4 | $M_3Q$ | $H_2$ | Not Measured | Translucent |

The weight loss data from Examples 1,2 and 3, as determined by thermal gravimetric analysis, is presented in the graph of FIG. 1. In the graph of FIG. 1, the percent weight loss in each sample is plotted on the ordinate while the increase in heating temperature is plotted on the abscissa. The graph of FIG. 1 shows that a significant portion of the weight loss in each sample has occurred at temperatures as low as 900° C. while weight loss was essentially completed at 1200° C. Substantially no evidence of crystallization was found by x-ray diffraction of the pyrolized material, and substantially no bonding between carbon and oxygen atoms was found by infra-red spectroscopy of the same. The weight loss in Example 4 followed the same temperature pattern as in Examples 1,2 and 3.

The index of refraction was measured on the silicon-oxy-carbide glass sample of Example 2 as 1.58, using a sodium light frequency of 5,893 angstroms. Glasses, in general, are known to have a refractive index between about 1.5 to 1.9 at the sodium frequency of 5,893 angstroms. The refractive index is the phase velocity of radiation in free space divided by the phase velocity of the same radiation in a specified medium.

EXAMPLES 5-7

Three pyrolysis examples were conducted according to the method of this invention. One uncured DT precursor resin and two cured or crosslinked DT precursor resins were pyrolized while weight loss from the resins was measured by thermal gravimetric analysis. Two examples were heated in a hydrogen atmosphere and one example in a helium atmosphere at a rate of 10° C./minute until weight loss ended. The measured weight loss and final composition of the silicon-oxy-carbide glass formed after pyrolysis are shown in Table II.

TABLE II

| | Thermal Gravimetric Analysis of Pyrolized Resins | | | | | |
|---|---|---|---|---|---|---|
| Example No. | Sample Precursor Resin | Atmosphere | Weight Loss % | Composition Weight % | | |
| | | | | Si | O | C |
| 1 | uncured | $H_2$ | 25 | 47 | 41 | 12 |
| 2 | cured | $H_2$ | 17.5 | 51 | 32 | 11.22 |
| 3 | cured | He | 15.5 | 51 | 32 | 11.22 |

Conventional carbon and silicon values were measured by conventional wet chemistry techniques for dissolved carbon and silicon. Oxygen content was measured by neutron activation.

Figure 2:
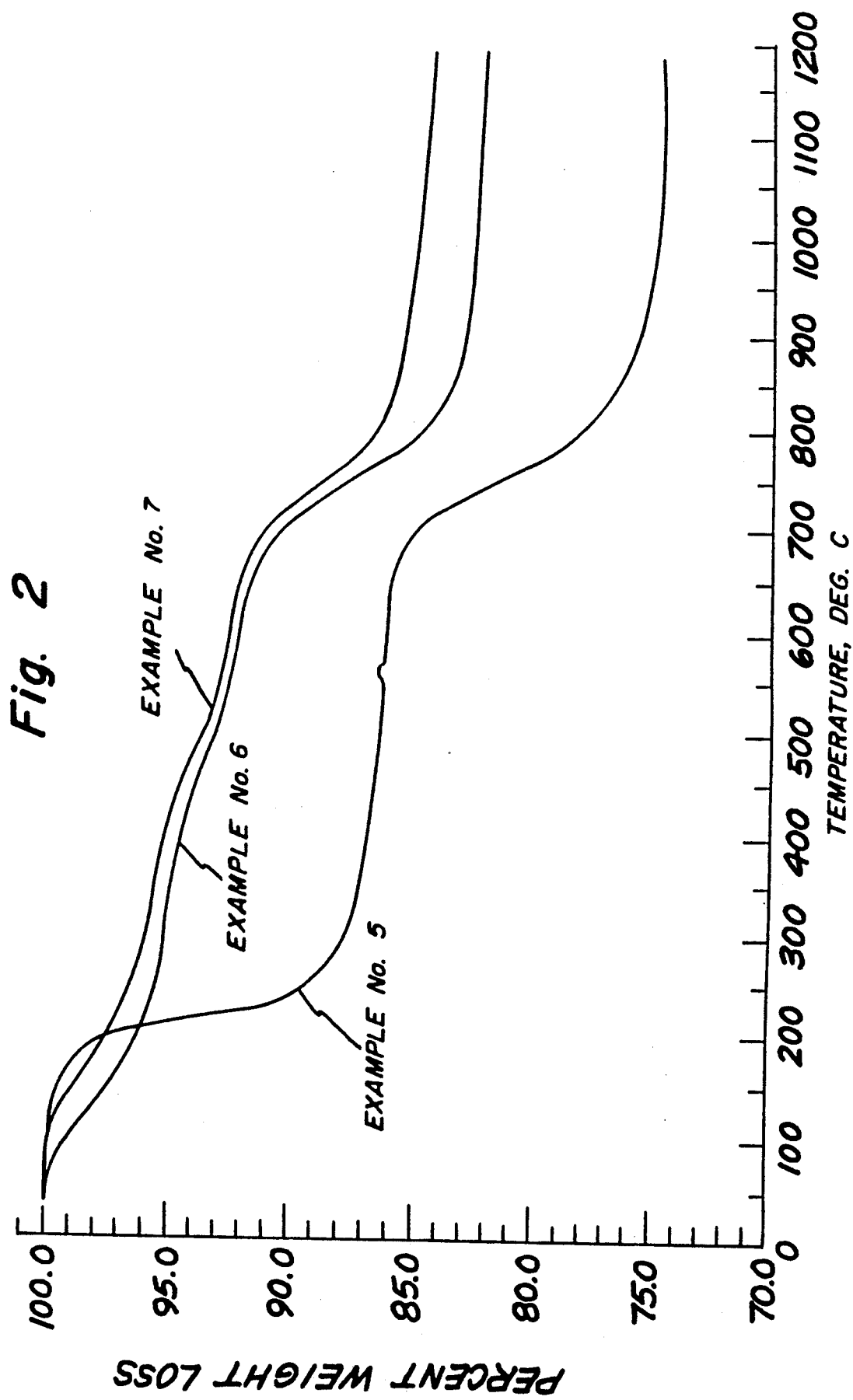
FIG. 2 is a graph showing the weight lost during pyrolysis of DT methyl silicone precursor resins.

The weight loss data from Examples 5-7, as determined by thermal gravimetric analysis, is presented in the graph of FIG. 2. In the graph of FIG. 2, the percent weight loss in each sample is plotted on the ordinate while the increase in heating temperature is plotted on the abscissa. The graph of FIG. 2 shows that a significant portion of the weight loss in each sample has occurred at temperatures as low as 900° C. while weight loss was essentially completed at 1200° C.

EXAMPLE 8

A sample of consolidated silicon-oxy-carbide glass was produced by pyrolizing a DT precursor resin in flowing hydrogen at 1400° C. The DT precursor resin was placed in a molybdenum boat and pyrolized as described herein. The pyrolized precursor resin was pulverized in six 25 gram batches in a planetary mill using an agate mortar and an agate media of ¼inch diameter. This produced 150 grams of silicon-oxy-carbide powder having a surface area of 2.2 m²/gram which is an equivalent spherical diameter of about 1.16 micrometers.

About 120 grams of the silicon-oxy-carbide powder were hot pressed in a two-inch diameter die that was faced with a graphite sheet separating agent. The graphite sheet prevents the powder from sintering to the die while it is being hot pressed. The sample was heated at a rate of 10° C./minute up to 1650° C. and held for 30 minutes at 1650° C. while a uniaxial pressure of 6 ksi was applied. An essentially fully dense sample was produced having the properties shown below in Table III.

TABLE III

| Properties of Consolidated Silicon-Oxy-Carbide Glass | | | | |
|---|---|---|---|---|
| Density (gram/CC) | Viscosity at 1565° C. (poise) | Elastic Modulus (psi) | Thermal Expansion (1/°C.) | Fracture Strength (Ksi) |
| 2.35 | $2 \times 10^{12}$ | $14.2 \times 10^6$ | $3.1 \times 10^6$ | 24.7 |

High resolution transmission electron microscopy of the hot pressed material showed 20 to 100 angstrom sized particles of beta silicon carbide in an otherwise amorphous matrix. Substantially no evidence of crystallization was found by x-ray diffraction of the hot pressed material.

EXAMPLE 9

A sample of crosslinked resin silicon-oxy-carbide glass was produced by slowly pyrolizing a crosslinked DT precursor resin. Equal portions of toluene and precursor resin were mixed with a crosslinking agent in the amount of about 4 weight percent of the precursor resin. This mixture was poured into a glass dish and the toluene was allowed to slowly evaporate by holding at room temperature for a period of 24 hours. As toluene evaporated, the precursor resin was crosslinking. The crosslinked sample was heated from room temperature to 500° C. in 10 hours, from 500° C. to 800 C in 16 hours, from 800° C. to 1100° C. in 4 hours and held at 1100° C. for 1 hour. This produced an overall heating rate of about 0.6° C./minute. The sample was then furnace cooled. A fully dense sheet of crosslinked resin silicon-oxy-carbide glass was produced having a thickness of about 2 mm.

EXAMPLE 10

The oxidation resistance and structural stability or resistance to devitrification of silicon-oxy-carbide glass was analyzed by heating hot pressed specimens of the glass from Example 8 for 240 hours at 1420° C. and 1520° C. in air. No weight loss from decomposition of silicon or carbon in the glass was measured. X-ray diffraction of a sectioned surface revealed no evidence of crystallization in the bulk material of either specimen. X-ray diffraction of exposed surfaces showed evidence of surface crystallization to cristobalite in both specimens in about 0.002 inch of the surface.

EXAMPLE 11-14

The composition of different glasses can be broadly defined by referring to the amount of each element in the glass. However, it is the short-range ordering in glasses that give them their different properties. Therefore, by characterizing the short-range ordering in glasses different glass compositions can be defined with respect to properties. In Example 5, the short range ordering of the translucent silicon-oxy-carbide glass of this invention is determined by defining the percentage of each of the polyatomic units; tetracarbosilicon, monocarbosiloxane, dicarbosiloxane, and tetraoxysilicon that are present in the glass.

Figure 3:
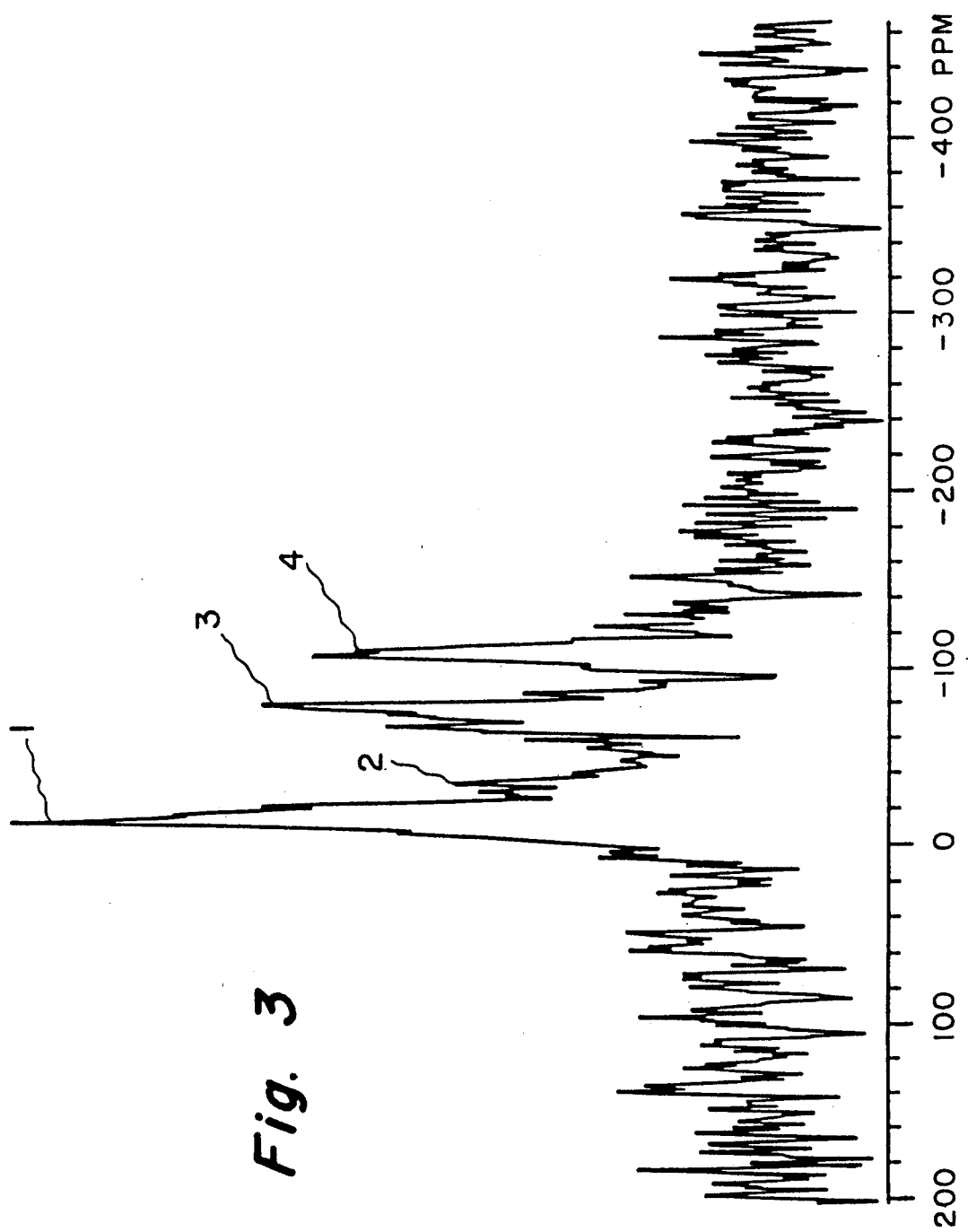
FIG. 3 is a graphical presentation of the $^{29}$Silicon nuclear magnetic resonance spectrum of translucent silicon-oxy-carbide glass formed from an MQ resin.

The $^{29}$Silicon solid state nuclear magnetic resonance spectrum of a sample of translucent silicon-oxy-carbide glass from Example 2 was recorded and is presented in FIG. 3. Another sample of silicon-oxy-carbide glass was prepared by pyrolizing a sample of DT precursor resin at 100° C. in flowing hydrogen. A sample of resin cured silicon-oxy-carbide glass was prepared by pyrolizing a sample of crosslinked DT precursor resin at 1100° C. in flowing hydrogen. $^{29}$Silicon solid state nuclear magnetic resonance spectra recorded from these samples are presented in FIGS. 4 and 5. FIG. 6 is the $^{29}$Silicon nuclear magnetic resonance spectrum from a sample of "Nicalon" silicon carbide fibre. On the ordinate of FIGS. 3-6 is plotted the intensity of radiation measured from the excited sample, and on the abscissa is plotted the parts per million (ppm) in chemical shift from a tetramethyl silicon standard that fixes the zero point on the abscissa. The chemical shift in ppm are known for many polyatomic units, for example tetraoxysilicon, dicarbosiloxane and monocarbosiloxane are shown in; "NMR Basic Principles and Progress 29Si-NMR Spectroscopic Results", Editors P. Diehl, R. Kosfeld, Springer Verlag Berlin Heidelberg 1981 at pp. 186, 184 and 178. Therefore, each peak in FIGS. 3-6 defines the short-range ordering of specific silicon polyatomic units.

In FIG. 3, the spectrum of the silicon-oxy-carbide glass prepared in Example 2 and containing peaks labeled 1 through 4 is shown. Peak 1 is tetracarbosilicon, peak 2 is dicarbosiloxane, peak 3 is monocarbosiloxane, and peak 4 is tetraoxysilicon. By integrating the area under each peak, the fraction of each of these polyatomic units that is present in the glass can be determined. A correction for background interference was made to the spectra in FIGS. 3-6 before determining the integrated area under each peak.

The integrated area under each peak in FIG. 3 reveals a composition for the silicon-oxy-carbide glass of Example 2, comprising in weight percent about ±5 percent of the following, about 33 percent tetracarbosilicon, about 17 percent dicarbosiloxane, about 26 percent monocarbosiloxane, and about 23 percent tetraoxysilicon. Analysis of the nuclear magnetic resonance spectra and the translucent appearance of the glass indicates that up to a trace amount of elemental carbon of about 0.1 weight percent is dispersed in the glass.

Figure 4:
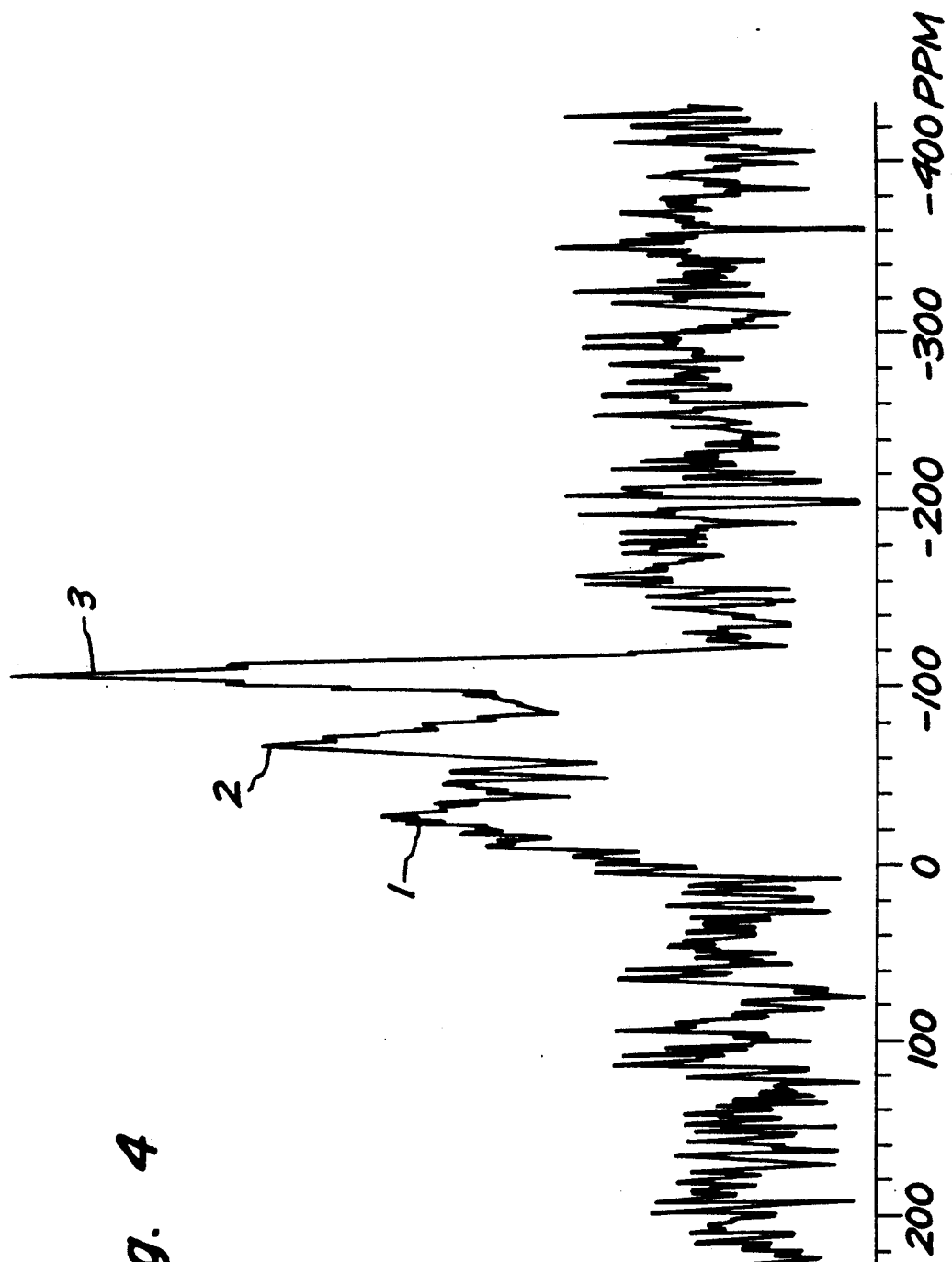
FIG. 4 is a graphical presentation of the $^{29}$ Silicon nuclear magnetic resonance spectrum of silicon-oxy-carbide glass formed from a DT resin.

In FIG. 4, the spectra of silicon-oxy-carbide glass containing peaks labeled 1 through 3 is shown. Peak 1, the broadest peak, represents a small amount of tetracarbosiloxane and a large amount of dicarbosiloxane, peak 2 defines monocarbosiloxane, and peak 3 defines tetraoxysilicon. By integrating the area under each peak, the fraction of each of these polyatomic units can be determined.

The integrated area under each peak in FIG. 4 reveals a composition for silicon-oxy-carbide glass, comprising in weight percent up to about 6 percent tetracarbolisicon and about ±5 percent of the following, about 22 percent dicarbosiloxane, 24 percent monocarbosiloxane, and 39 percent tetraoxysilicon.

Figure 5:
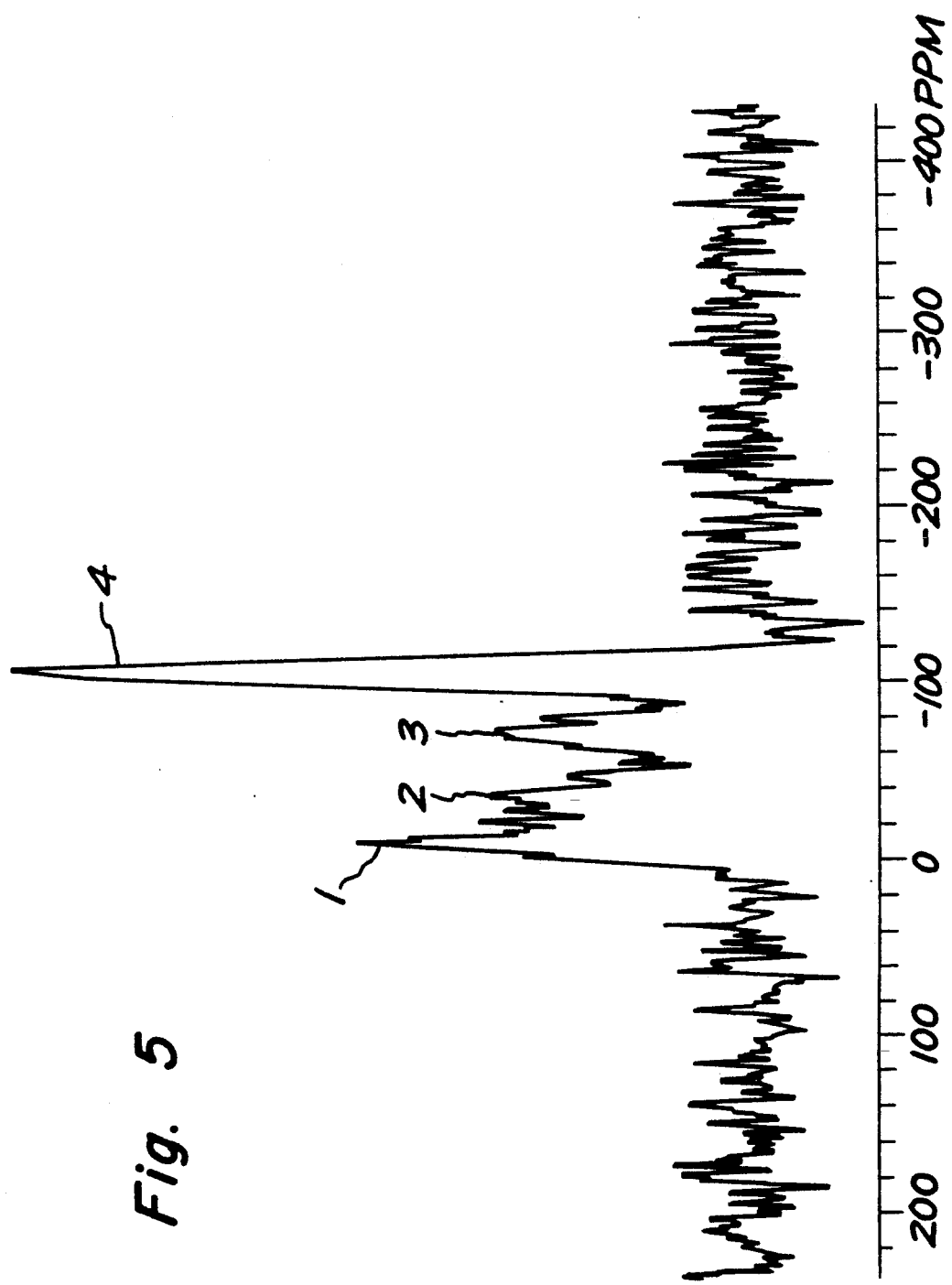
FIG. 5 is a graphical presentation of the $^{29}$ Silicon nuclear magnetic resonance spectrum of crosslinked resin silicon-oxy-carbide glass.
Figure 6:
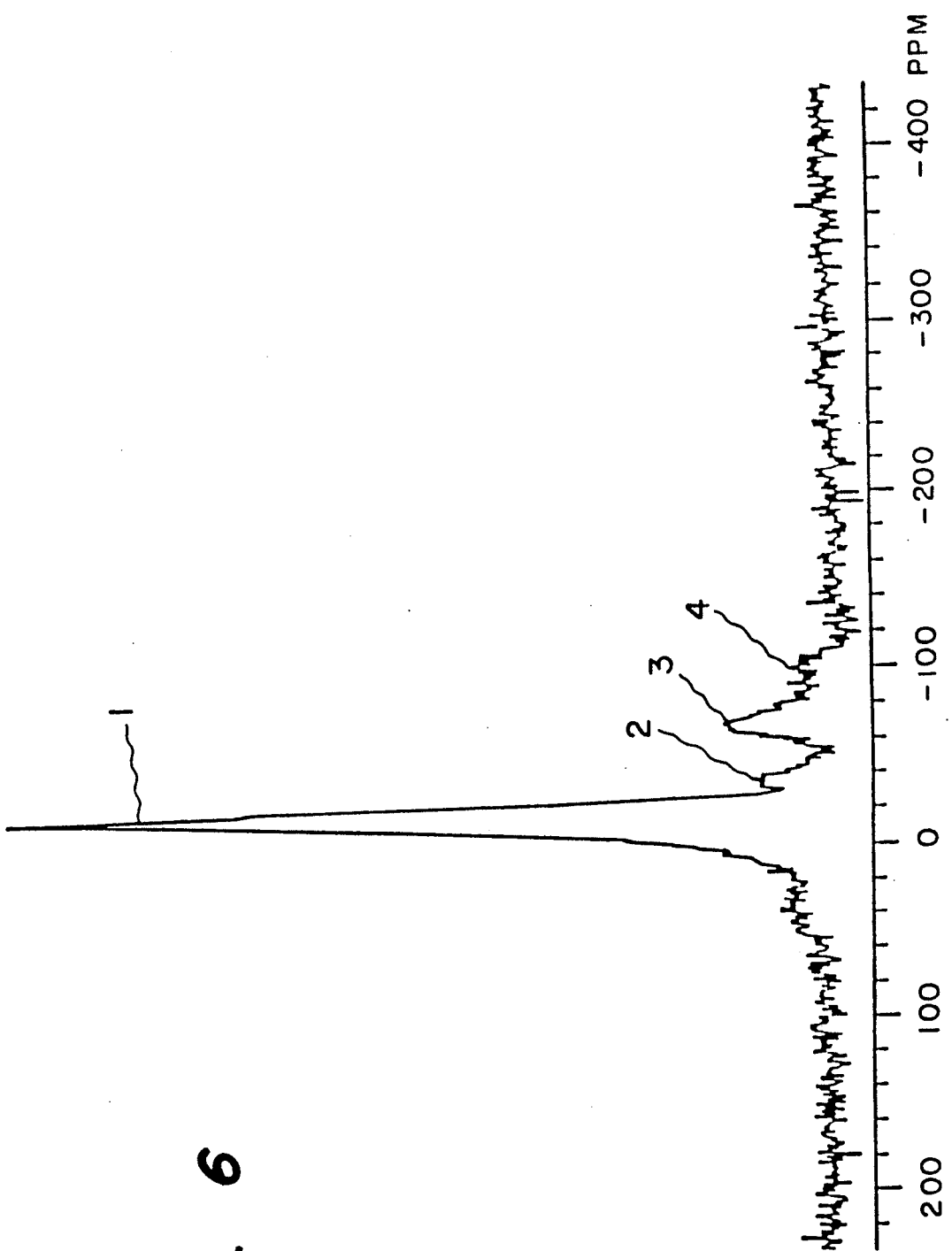
FIG. 6 is a graphical presentation of the $^{29}$Silicon nuclear magnetic resonance spectrum of "Nicalon" silicon carbide.

The spectra of crosslinked resin silicon-oxy-carbide glass shown in FIG. 5 indicates a composition comprising, in weight percent, about ±5 percent of the following: about 17 percent tetracarbosilicon, about 16 percent dicarbosiloxane, about 16 percent monocarbosiloxane, and about 43 percent tetraoxysilicon. Peak 1 is tetracarbosilicon, peak 2 is dicarbosiloxane, peak 3 is monocarbosiloxane, and peak 4 is tetraoxysilicon.

The spectrum in FIGS. 3-5 can be compared to the silicon carbide spectrum in FIG. 6 measured from a "Nicalon" silicon carbide fibre sample. The composition for "Nicalon" in FIG. 6, in weight percent, is about 68 percent silicon carbide, about 8 percent dicarbosiloxane, about 17 percent monocarbosiloxane, and about 7 percent tetraoxysilicon. From the spectrum in FIG. 6, it can be seen that "Nicalon" fibres are comprised principally of silicon carbide with minor amounts of dicarbosiloxane, monocarbosiloxane, and tetraoxysilicon. In contrast, the spectrum of FIG. 3-5 shows that silicon-oxy-carbide glass is comprised of tetracarbosilicon with substantial amounts of dicarbosiloxane, monocarbosiloxane, and tetraoxysilicon. This unique short range ordering of silicon-oxy-carbide glass that bonds carbon to silicon in a heretofore unknown manner in glasses, provides the increased devitrification and decomposition resistance and characterizes the glasses of this invention.

The composition of the translucent silicon-oxy-carbide glass sample in Example 2 and the Nicalon sample can also be described by referring to the mole percent of each polyatomic unit. Table IV below provides the conversion between mole percent and weight percent for each of these compositions. The compositions disclosed in Table IV are considered to be within ±5 weight percent or ±5 mole percent for each polyatomic unit.

TABLE IV

|  | Example 11 MQ Resin | | Example 14 "Nicalon" SiC | | Example 12 DT Resin | | Example 13 Crosslinked DT Resin | |
| --- | --- | --- | --- | --- | --- | --- | --- | --- |
|  | Wt % | Mole % | Wt % | Mole % | Wt % | Mole % | Wt % | Mole % |
| Tetraoxysilicon | 23 | 22 | 7 | 5 | 39 | 43 | 43 | 41 |
| Monocarbosiloxane | 26 | 26 | 17 | 13 | 24 | 28 | 16 | 16 |
| Dicarbosiloxane | 17 | 17 | 8 | 7 | 22 | 29 | 16 | 19 |
| Tetracarbosilicon | 33 | 35 | 68 | 75 | up to 6 | up to 4 | 17 | 24 |

The mole percent gives the percentage of each polyatomic unit in the samples on a molecular basis. The percentage of the silicon atoms in the samples that is bonded to oxygen or carbon can then be determined using the mole percent. The silicon-oxy-carbide glass sample in Example 11, originally prepared in Example 2, has about 73 to 83 percent of the silicon atoms in the glass bonded to at least an individual carbon atom. The silicon-oxy-carbide glass sample in Example 12 has about 38 to 48 percent of the silicon atoms in the glass bonded to at least an individual carbon atom. The silicon-oxy-carbide glass sample in Example 13 has about 36 to 46 percent of the silicon atoms in the glass bonded to at least an individual carbon atom. The "Nicalon" silicon carbide sample had about 90 to 100 percent of the silicon atoms in the silicon carbide sample bonded to carbon.

EXAMPLE 15

Approximately 7 grams of precursor resin, comprised of M and Q units in a ratio of about 0.8:1, was dissolved in an excess amount of toluene. The dissolved resin was heated to remove the excess toluene, leaving the precursor resin dissolved in about 2 grams of toluene. About 8 grams of foaming agent was intimately mixed with the dissolved resin, after which about 5 cc of water was stirred in until the solution became creamy. The foaming agent used in the method of this invention is an isocyonate-capped polyoxyethylene polyol reaction product having an average isocyonate functionality greater than 2 and up to about 6 or more as discussed above. The solution was allowed to rise for about 2 minutes and then dried at room temperature for about 24 hours. The foam was heated to 470° C. in 10 hours, and held at 70° C. for 1 hour to decompose the polyurethane foam. A black cellular structure remained after the polyurethane had been removed, demonstrating that the precursor resin had crosslinked sufficiently to retain the foamed structure without the support of the polyurethane carrier foam.

EXAMPLE 16

Silicon-oxy-carbide glass fibres were made by the following process. A solution of DT precursor resin and toluene was mixed in a 1:1 ratio, and gamma amino propyl triethoxy silane was added as a curing agent in the amount of 2 weight percent of the resin. The solution was allowed to crosslink until a strand could be pulled from the solution. The end of a fibre blank, 0.5 mm in diameter, was dipped into the resin solution and withdrawn, thereby pulling a fibre of precursor resin from the solution. This procedure was repeated several times and the fibres were heated at 50° C. to dry and fully crosslink them for easy handling. The fibres were then pyrolized according to the method described herein, forming silicon-oxy-carbide glass fibres of about 0.3 mm in diameter.

EXAMPLE 17

Ceramic composites having an amorphous silicon-oxy-carbide ceramic matrix were made by preparing an infiltrant slurry consisting of by weight; 3 parts DT precursor resin, 3 parts 0.2 micron silicon carbide powder, and 4 parts toluene. This slurry was infiltrated into a continuous carbon fibre tow by pulling the tow through an agitated bath of the slurry. A tow is a strand made by weaving individual fibres together. The infiltrated tow was wound on a hexagonal drum to form unidirectional resin impregnated panels. After the toluene evaporated the dried panels were removed from the drum. The panels were cut into tapes and several tapes were stacked in a rectangular die maintaining the unidirectional alignment of the fibres. The layered tapes were pressed at 300 MPa while the die was slowly heated up to 200 C and held for 15 minutes. The resin flowed to fill gaps between the fibre tows and layers of tape to form a bar having a continuous matrix of crosslinked resin and silicon carbide powder surrounding the fibre tows. The bar was removed from the die and pyrolized in an argon atmosphere by heating at 2° C. per minute to 1200° C. and holding at 1200° C. for 30 minutes. A ceramic composite having a matrix of emosphous silicon-oxy-carbide glass binding a ceramic filler and reinforced by carbon fibres was formed. The ceramic composite had a density of 1.73 g/cc and contained 19 volume percent open porosity. Small bars were machined from the composite panel and mechanical properties were measured using 3-point bend testing. Ultimate bend strength was 200 MPa and the fracture energy was greater than 2.3 Kj/m$^2$. At fracture the composite showed non-brittle behavior characterized by fibre debonding and pullout.

EXAMPLE 18

A second ceramic composite was formed using the procedure described in Example 17, however, the infiltrant slurry consisted of, by weight, 2 parts DT precursor resin, 3 parts of 3.5 micron silicon carbide powder, and 5 parts toluene. The ceramic fibre was a boron-nitride coated "Nicalon" silicon carbide fibre. The impregnated and consolidated fibre panels were pyrolized to form a ceramic composite having a density of 2.08 g/cc, 18% open porosity, ultimate bend strength of 312 Mpa, and fracture energy of 2.4 Kj/m$^2$.

EXAMPLE 19

A third ceramic composite was formed using the procedure of Example 17, however, the infiltrant slurry consisted of, by weight, 2 parts DT precursor resin, 3 parts of 2 micron mullite powder, and 5 parts toluene. The ceramic fibre was an alumino-boro-silicate fibre. Mullite is a refractory ceramic of aluminosilicate having the chemical formula $2SiO_2.3Al_2O_3$. The impregnated and consolidated fibre panels were pyrolized to form a composite ceramic with a density of 2.39 g/cc, 13.5% open porosity, and ultimate bend strength of 200 MPa.

What is claimed is:

1. A translucent glass comprising silicon, oxygen, and carbon in a distribution of polyatomic units comprising, in weight percent, about 18 to 28 percent tetraoxysilicon, about 21 to 31 percent monocarbosiloxane, about 12 to 22 percent dicarbosiloxane, and about 28 to 38 percent tetracarbosilicon, with up to a trace amount of elemental carbon dispersed in the glass so that the glass permits at least the partial transmission of light through the glass.

2. A translucent glass comprising silicon, oxygen, and carbon wherein about 73 to 83 percent of the silicon atoms have at least one bond to a carbon atom forming a silicon-oxy-carbide glass.

3. A process for forming a translucent glass comprising, heating a methyl silicone precursor resin comprised of M and Q units in a ratio of about 0.7:1 or greater in a non-oxidizing atmosphere at a temperature that will pyrolize the resin, said heating being performed for a period of time ending when weight loss from the pyrolizing resin substantially stabilizes; said pyrolized resin forming a translucent silicon-oxy-carbide glass.

4. The process of claim 3 wherein said precursor resin is comprised of M and Q units in a ratio up to about 3:1, respectively.

5. The process of claim 4 wherein said heating is performed between 900° C. to 1600° C.

6. The process of claim 5 wherein said heating is performed for a period of time that allows a weight loss from the resin of approximately 17 to 54 percent.

7. The process of claim 6 wherein said heating is performed in a hydrogen gas atmosphere.

8. The process of claim 3 wherein said heating is performed for a period of time that allows the resin to fully densify.

9. A process for forming a translucent silicon-oxy-carbide glass article, comprising:
dissolving a methyl silicone precursor resin in a solvent, the precursor resin being comprised of M and Q units in a ratio of about 0.7:1 or greater;
shaping the resin to form the article;

evaporating the solvent form the shaped resin; and heating the resin in a non-oxidizing atmosphere at a temperature that will pyrolize the resin and at a rate that minimizes the formation of voids in the glass, said heating being performed for a period of time ending when weight loss from the pyrolizing resin substantially ends.

10. The process of claim 9 wherein said precursor resin is comprised of M and Q units in a ratio up to about 3:1, respectively.

11. The process of claim 10 wherein said step of heating is performed between 900° C. and 1600° C.

12. The process of claim 11 wherein said step of heating is performed in a hydrogen gas atmosphere.

13. The process of claim 12 wherein said step of heating is performed for a period of time that allows a weight loss from the resin of approximately 17 to 54 percent.

14. The process of claim 13 wherein said step of heating is performed at a rate of heating less than about 1° C. per minute.

15. The process of claim 9 wherein said heating is performed for a period of time that allows the pyrolizing resin to form a glass that is fully densified.

16. A translucent glass fibre comprising; an amorphous mass of silicon, oxygen, and carbon in a distribution of polyatomic units comprising, in weight percent, about 18 to 28 percent tetraoxysilicon, about 21 to 31 percent monocarbosiloxane, about 12 to 22 percent dicarbosiloxane, about 28 to 38 percent tetracarbosilicon.

17. A composite ceramic comprising: at least one ceramic fibre, a ceramic filler, and a matrix of silicon-oxy-carbide glass binding the fibre and filler, the glass comprising silicon, oxygen and carbon in a distribution of polyatomic units comprising, in weight percent, about 18 to 28 percent tetraoxysilicon, about 21 to 31 percent monocarbosiloxane, about 12 to 22 percent dicarbosiloxane, and about 28 to 38 percent tetracarbosilicon.

18. A translucent glass comprising chemically bonded silicon, oxygen, and carbon with the glass substantially free of chemical bonding between oxygen and carbon atoms, the glass being produced by a process comprising:
heating a methyl silicone precursor resin comprised of M and Q units in a ratio of about 0.7:1 or greater, in a non-oxidizing atmosphere at a temperature that will pyrolize the resin, said heating being performed for a period of time ending when weight loss from the pyrolizing resin substantially stabilizers.

19. A glass comprising chemically bonded silicon, oxygen, and carbon with the glass substantially free of chemical bonding between oxygen and carbon atoms, the glass being produced by a process comprising:
heating a methyl silicone precursor resin comprised of M and Q units in a ratio up to about 0.7:1, in a non-oxidizing atmosphere at a temperature that will pyrolize the resin, said heating being performed for a period of time ending when weight loss from the pyrolizing resin substantially stabilizes.

20. A process for forming a glass comprising: heating a methyl silicone precursor resin comprised of M and Q units in a ratio up to about 0.7:1, in a non-oxidizing atmosphere at a temperature that will pyrolize the resin, said heating being performed for a period of time ending when weight loss from the pyrolizing resin substantially stabilizes; said pyrolized resin forming a silicon-oxy-carbide glass.

21. A cellular glass structure comprising:
chemically bonded silicon, oxygen, and carbon in a cellular glass structure having a distribution of polyatomic units comprising in weight percent about 18 to 28 percent tetraoxysilicon, about 21 to 31 percent monocarbosiloxane, about 12 to 22 percent dicarbosiloxane, about 28 to 38 percent tetracarbosilicon, and up to 1 percent elemental carbon dispersed in the cellular glass structure.

22. A cellular glass structure comprising:
chemically bonded silicon, oxygen, and carbon in a cellular glass structure having a distribution of polyatomic units comprising in weight percent about 38 to 48 percent tetraoxysilicon, about 11 to 21 percent monocarbosiloxane, about 11 to 21 percent dicarbosiloxane, about 12 to 22 percent tetracarbosilicon, and up to about 9 percent elemental carbon dispersed in the cellular glass structure.

23. The cellular glass structure of claim 22 wherein the cells are substantially closed forming an insulating glass structure.

24. The cellular glass structure of claim 22 wherein a substantial portion of the cells are open forming a filtering glass structure.

25. The cellular glass structure of claim 22 further comprising a ceramic filler dispersed in the glass structure.

26. A glass composition that remains structurally stable at temperature up to abut 1650° C. comprising; silicon, oxygen, and carbon in a distribution of polyatomic units comprising in weight percent about 34 to 48 percent tetraoxysilicon, about 11 to 29 percent monocarbosiloxane, about 11 to 27 percent dicarbosiloxane, up to about 22 percent tetracarbosilicon, and up to about 9 percent elemental carbon dispersed in the glass matrix.

27. The glass of claim 26 wherein silicon, oxygen, and carbon are distributed in polyatomic units comprising, in weight percent, about 38 to 48 percent tetraoxysilicon, about 11 to 21 percent monocarbosiloxane, about 11 to 21 percent dicarbosiloxane, about 12 to 22 percent tetracarbosilicon, and up to about 9 percent elemental carbon dispersed in the glass matrix.

28. The glass of claim 26 wherein silicon, oxygen, and carbon are distributed in polyatomic units comprising, in weight percent, about 34 to 44 percent tetraoxysilicon, about 19 to 29 percent monocarbosiloxane, about 17 to 27 percent dicarbosiloxane, up to about 6 percent tetracarbosilicon, and up to about 9 percent elemental carbon dispersed in the glass matrix.

29. A glass composition that remains structurally stable at temperature up to about 1650° C. comprising; silicon, oxygen, and carbon wherein about 52 to 64 percent of the silicon atoms have at least one bond to a carbon atom, and up to abut 9 weight percent carbon is present as elemental carbon dispersed within the glass matrix, forming a silicon-oxy-carbide glass.

30. A process for forming a glass, comprising heating a methyl silicone precursor resin from the group consisting of MQ resins and DT resins, in a non-oxidizing atmosphere at a temperature that will pyrolize the resin, said heating being performed for a period of time ending when weight loss from the pyrolizing resin substantially ends;

said pyrolizing resin forming a silicon-oxy-carbide glass that remains structurally stable at temperatures up to about 1650° C.

31. The process of claim 30 before the step of heating further comprising the step of crosslinking the DT methyl silicone precursor resin by dissolving the DT resin in a solvent and adding a curing agent.

32. The process of claim 31 wherein said heating is performed between 900° C. to 1650° C.

33. The process of claim 32 wherein said heating is performed for a period of time that allows a weight loss from the resin of approximately 11 to 54 percent.

34. The process of claim 33 wherein said heating is performed in a hydrogen gas atmosphere.

35. The process of claim 33 wherein said heating is performed in a helium gas atmosphere.

36. A process for forming a silicon-oxy-carbide glass article comprising:
heating a methyl silicone precursor resin from the group consisting of MQ resins and DT resins, in a non-oxidizing atmosphere at a temperature that will pyrolize the resin, said heating being performed for a period of time ending when weight loss from the pyrolizing resin substantially ends;
pulverizing said deposit into a powder having a particle size of about 0.1 to 2 microns; and
consolidating said particles through the application of heat and pressure that will densify the powder into the article.

37. The process of claim 36 wherein said step of heating is performed between 900° C. and 1650° C.

38. The process of claim 37 wherein said step of heating is performed in a hydrogen gas atmosphere.

39. The process of claim 38 wherein said step of heating is performed for a period of time that allows a weight loss from the resin of approximately 11 to 54 percent.

40. The process of claim 39 wherein said step of consolidating comprises applying a uniaxial pressure to the powder of at least about 5 ksi and heating the powder to about 1550° C. to 1650° C.

41. The process of claim 39 wherein said step of consolidating comprises applying an isostatic pressure to the powder of at least about 8 ksi and heating the powder to about 1200° C. to 1600° C.

42. A process for forming a silicon-oxy-carbide glass article comprising:
dissolving a DT methyl silicone precursor resin in a solvent;
adding a curing agent to crosslink the resin;
shaping the resin to form the article;
evaporating the solvent from the crosslinking resin; and
heating the resin in a non-oxidizing atmosphere at a temperature that will pyrolize the resin, said heating being performed for a period of time ending when weight loss from the pyrolizing resin substantially ends.

43. The process of claim 42 wherein said step of heating is performed between 900° C. and 1650° C.

44. The process of claim 43, wherein said step of heating is performed for a period of time that allows a weight loss from the resin of approximately 11 to 35 percent.

45. The process of claim 44 wherein said step of heating is performed at a rate of heating less than about 1° C. per minute.

46. The process of claim 45 wherein said curing agent is ammonium hydroxide.

47. The process of claim 45 wherein said curing agent is a silicon containing amine.

48. The process of claim 45 wherein said step of heating is performed in a hydrogen gas atmosphere.

49. The process of claim 45 wherein said step of heating is performed in a vacuum.

50. A glass fibre comprising; silicon, oxygen, and carbon in a distribution of polyatomic units comprising in weight percent about 38 to 48 percent tetraoxysilicon, about 11 to 21 percent monocarbosiloxane, about 11 to 21 percent dicarbosiloxane, about 12 to 22 percent tetracarbosilicon, and up to about 9 percent elemental carbon dispersed in the glass matrix.

51. A process for forming silicon-oxy-carbide glass fibres, comprising:
dissolving a DT methyl silicone precursor resin in a solvent;
adding a curing agent to the dissolved resin;
drawing fibres from the cured resin;
evaporating the solvent from the fibres; and
heating the fibres in a non-oxidizing atmosphere at a temperature that will pyrolize the resin, said heating being performed for a period of time ending when dicarbosiloxane, peak 3 is monocarbosiloxane, and peak 4 is weight loss from the pyrolizing resin substantially ends.

52. A composite ceramic comprising; at least one ceramic fibre, a ceramic filler, and a matrix of silicon-oxy-carbide glass binding the fibre and filler, the glass comprising silicon, oxygen, and carbon in a distribution of polyatomic units comprising in weight percent about 34 to 48 percent tetraoxysilicon, about 11 to 29 percent monocarbosiloxane, about 11 to 27 percent dicarbosiloxane, up to about 22 percent tetracarbosilicon, and up to about 9 percent elemental carbon dispersed in the glass matrix.

53. A process for making a ceramic composite comprising:
dissolving a precursor resin from the group consisting of MQ resins and DT resin in a solvent;
adding a particulated ceramic filler to the resin;
coating at least one ceramic fibre with the resin;
shaping the coated fibre into the composite;
evaporating the solvent from the shaped fibre; and
heating the shaped fibre in a non-oxidizing atmosphere at a temperature that will pyrolize the resin, said heating performed for a period of time ending when weight loss from the pyrolizing resin substantially ends, thereby forming a matrix of silicon-oxy-carbide glass and ceramic filler surrounding the ceramic fibre.

54. The process of claim 53 comprising before the step of heating, consolidating layers of coated fibre through the application of heat and pressure to form a continuous resin matrix around the fibre.

* * * * *